US012577915B2

(12) United States Patent (10) Patent No.: US 12,577,915 B2

Becoulet et al. (45) **Date of Patent: *Mar. 17, 2026**

(54) FLEXIBILITIES IN A GAS TURBINE ENGINE WITH A SPEED REDUCER

(71) Applicant: Safran Aircraft Engines, Paris (FR)

(72) Inventors: Julien Fabien Patrick Becoulet, Moissy-Cramayel (FR); Alexandre Jean-Marie Tan-Kim, Moissy-Cramayel (FR); Maxime Paul Numa Givert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/690,524

(22) PCT Filed: Sep. 7, 2022

(86) PCT No.: PCT/FR2022/051690

§ 371 (c)(1),
(2) Date: Mar. 8, 2024

(87) PCT Pub. No.: WO2023/037075

PCT Pub. Date: Mar. 16, 2023

(65) Prior Publication Data

US 2024/0410319 A1 Dec. 12, 2024

(30) Foreign Application Priority Data

Sep. 10, 2021 (FR) ...................................... 2109530

(51) Int. Cl.
*F02C 7/36* (2006.01)
*F02C 7/06* (2006.01)
(52) U.S. Cl.
CPC ................. *F02C 7/36* (2013.01); *F02C 7/06* (2013.01); *F05D 2260/40311* (2013.01)

(58) Field of Classification Search
CPC ..... F02C 7/36; F02C 7/06; F05D 2260/40311
See application file for complete search history.

(56) References Cited

U.S. PATENT DOCUMENTS 11,022,044 B1 * 6/2021 Spruce ...................... F02K 3/06
11,215,122 B2 * 1/2022 Sheridan ................. F16H 57/08
11,781,487 B2 * 10/2023 Spruce ................... B64D 27/10
415/124.2

FOREIGN PATENT DOCUMENTS

EP 3 825 575 A1 5/2021
EP 3 832 101 A1 6/2021
(Continued)

OTHER PUBLICATIONS

PCT/FR2022/051690 English Translation of Written Opinion of the International Searching Authority (Year: 2023).*

*Primary Examiner* — Courtney D Heinle
*Assistant Examiner* — John S Hunter, Jr.
(74) *Attorney, Agent, or Firm* — BIRCH, STEWART, KOLASCH & BIRCH, LLP

(57) ABSTRACT

Disclosed is an assembly for a turbomachine, comprising:
•—a first connection element (9) having a first radial compliance (SR1); •—a second connection element (10) having a second radial compliance (SR2); •—a third connection element (11) having a third radial compliance (SR3); and •—a fourth connection element (12) having a fourth radial compliance (SR4), wherein a ratio of the first radial compliance (SR1) to the third radial compliance (SR3) is strictly lower than 10%, and/or a ratio of the first radial compliance (SR1) to the second radial compliance (SR2) is strictly lower than 4%, and/or a ratio of the first radial compliance (SR1) to the fourth radial compliance (SR4) is strictly lower than 50%.

17 Claims, 3 Drawing Sheets

(56)         References Cited

FOREIGN PATENT DOCUMENTS

| | | | |
|---|---|---|---|
| EP | 3 832 112 | A1 | 6/2021 |
| WO | WO2015/156885 | A2 | 10/2015 |
| WO | WO2015/156885 | A3 | 10/2015 |

* cited by examiner

FLEXIBILITIES IN A GAS TURBINE ENGINE WITH A SPEED REDUCER

FIELD OF THE INVENTION

The present invention relates to a gas turbine engine comprising a mechanical transmission device.

More specifically, the present invention relates to the radial flexibility of the mechanical transmission device.

BACKGROUND

With reference to FIG. 1, a gas turbine engine 1000 having a geared architecture is known from the background, the gas turbine engine 1000 being centered on a longitudinal axis X-X. Such a gas turbine engine 1000 is in particular used for the propulsion of an aircraft (not represented) onto which it is fixedly added.

As illustrated in FIG. 1, the gas turbine engine 1000 comprises a fan 1001 surrounded by a fairing 1002. Furthermore, the gas turbine engine 1000 comprises a casing 1 surrounding a low-pressure compressor section 1003, a high-pressure compressor section 1004, a combustion chamber 1005, a high-pressure turbine section 1006 and a low-pressure turbine section 1007.

The gas turbine engine 1000 also comprises a fan shaft 2, a low-pressure turbine shaft 4 and a high-pressure turbine shaft 1008, each shaft being movable in rotation relative to the casing 1 about the longitudinal axis X-X. The fan shaft 2 is supported in rotation by a pair of bearings 3 fixedly mounted on the casing 1.

The fan shaft 2 drives the fan 1001, the low-pressure turbine shaft 4 is driven by the low-pressure turbine section 1007 and drives the low-pressure compressor section 1003, and the high-pressure turbine shaft 1008 is driven by the high-pressure turbine section 1006 and drives the high-pressure compressor section 1004.

As visible in FIG. 1, the gas turbine engine 1000 also comprises a mechanical transmission device 8, otherwise called reduction gearbox.

In operation, an air stream is sucked by the fan 1001 within the gas turbine engine 1000. Part of this stream circulates within the casing 1 to be, successively, compressed by the low-pressure compressor section 1003 then the high-pressure compressor section 1004, ignited within the combustion chamber 1005, and finally expanded by the high-pressure turbine section 1006 then the low-pressure turbine section 1007.

This circulation makes it possible to drive in rotation the low-pressure turbine shaft 4 and the high-pressure turbine shaft 1006 about the longitudinal axis X-X. Furthermore, the low-pressure turbine shaft 4 drives the fan shaft 2 via the mechanical transmission device 8, which transmits a torque and a rotational speed from the low-pressure turbine shaft 4 to the fan shaft 2. The dynamic decoupling of the fan shaft 2 and of the low-pressure turbine shaft 4, enabled by the mechanical transmission device 8, allows the low-pressure turbine shaft 4 to reach much higher rotational speeds, without risking overspeed at the end of the fan blades 1001. Hence, the efficiency of the gas turbine engine 1000 is improved, and its size can be reduced.

The use of a mechanical transmission device 8 nevertheless poses a certain number of difficulties, including the mechanical stability of the mechanical transmission device 8 in operation, which directly influences its efficiency and its lifespan.

Indeed, in operation, the different components of the gas turbine engine 1000 are likely to follow dynamic evolutions that are different from each other. For example, the fan shaft 2 is likely to be subject to movements whose intensity and direction are different from movements to which the low-pressure turbine shaft 4 is likely to be subject. As the fan shaft 2 and the low-pressure turbine shaft 4 are mechanically linked to the mechanical transmission device 8, the latter is then likely to accumulate stresses in order to compensate for these different dynamic evolutions. Typically, the low-pressure turbine shaft 4 may be subject to a radial displacement, while the fan shaft 2 remains fixed radially. In this case, it is the mechanical transmission device 8 that dampens this difference in the radial movement, by accumulating radial mechanical stresses.

A solution to take into account this difficulty would be to strengthen the components of the mechanical transmission device 8 in order to be able to withstand these stresses throughout the lifespan of the gas turbine engine 1000. This solution is however not satisfactory because it is expensive and leads to an increase in the mass of the gas turbine engine 1000 which is such that the efficiency improvement authorized by the reduction gear architecture is annihilated.

Another solution to take into account this difficulty consists in trying to limit the stiffness of certain parts of the mechanical transmission device 8, and in particular to limit the stiffness of the connection elements 10, 11 supporting the mechanical transmission device 8. Values of ratios between these elements 10, 11 and stiffnesses of the support 1009 have thus been proposed, making it possible to limit the accumulation of the stresses within the mechanical transmission device 8. This solution is also not satisfactory. Indeed, it is generally not clear from this solution what portion of these elements 10, 11 must be made less stiff, nor the way in which this stiffness decrease can be measured. Therefore, the ratio values that have been proposed are in reality of no help in improving the lifespan of the mechanical transmission device 8, while limiting its weight.

There is therefore a need to overcome the drawbacks of the background.

DISCLOSURE OF THE INVENTION

One aim of the invention is to reduce the mechanical stresses within a mechanical transmission device of a geared turbine engine.

To this end, according to a first aspect of the invention, an assembly for a gas turbine engine is proposed, comprising:

a casing, a fan shaft movable in rotation relative to the casing about a longitudinal axis of the gas turbine engine, a first bearing configured to support in rotation the fan shaft, the first bearing being fixedly mounted on the casing, a turbine shaft movable in rotation relative to the casing about the longitudinal axis, a second bearing configured to support in rotation the turbine shaft, the second bearing being fixedly mounted on the casing, a support shaft movable in rotation relative to the casing about the longitudinal axis, a third bearing configured to support in rotation the support shaft, a mechanical transmission device, the turbine shaft driving the fan shaft via the mechanical transmission device,

a first connection element having a first end connected to the fan shaft and mounted on the first bearing, and a second end connected to the mechanical transmission device, the first connection element having a first radial flexibility, a second connection element having a third end connected to the turbine shaft and mounted on the second bearing, and a fourth end connected to the mechanical transmission device, the second connection element having a second radial flexibility, a third connection element having a fifth end fixedly mounted on the casing and a sixth end connected to the mechanical transmission device, the third connection element having a third radial flexibility, and a fourth connection element having a seventh end fixedly mounted on the casing and an eighth end connected to the third bearing, the fourth connection element having a fourth radial flexibility, wherein a ratio between the first radial flexibility and the third radial flexibility is strictly less than 10% and/or a ratio between the first radial flexibility and the second radial flexibility is strictly less than 4% and/or a ratio between the first radial flexibility and the fourth radial flexibility is strictly less than 50%.

Keeping the ratio between the first radial flexibility and the third radial flexibility strictly less than 10% and/or the ratio between the first radial flexibility and the second radial flexibility strictly less than 4% and/or the ratio between the first radial flexibility and the fourth radial flexibility strictly less than 50% ensures a distribution of the radial stresses between the connection elements which is optimal, which effectively reduces the mechanical stresses, in particular radial mechanical stresses, within the mechanical transmission device. Wear of the mechanical transmission device is therefore reduced, and its lifespan is extended. Furthermore, the efficiency of the gas turbine engine is improved.

Advantageously, but optionally, the assembly according to the invention can comprise at least one of the following characteristics, taken alone or in combination:

the mechanical transmission device is an epicyclic gear train comprising a ring gear, a plurality of planet gears supported by a carrier and a sun gear, the second end and the support shaft are each mounted on the ring gear which is movable in rotation about the longitudinal axis, the fourth end is mounted on the sun gear which is movable in rotation about the longitudinal axis, and the sixth end is mounted on the carrier, the second end and the support shaft are each mounted on the carrier which is movable in rotation about the longitudinal axis, the fourth end is mounted on the sun gear which is movable in rotation about the longitudinal axis, and the sixth end is mounted on the ring gear, the first bearing is a rolling comprising a row of balls, the second bearing is a rolling comprising a row of balls or of rollers, and the third bearing is a rolling comprising a row of balls, the second radial flexibility is comprised between $350 \cdot 10^{-9}$ m·N$^{-1}$ and $1{,}500 \cdot 10^{-9}$ m·N$^{-1}$, for example between $500 \cdot 10^{-9}$ m·N$^{-1}$ and $1{,}000 \cdot 10^{-9}$ m·N$^{-1}$, and is preferably $800 \cdot 10^{-9}$ m·N$^{-1}$, the third radial flexibility is greater than or equal to $20 \cdot 10^{-9}$ m·N$^{-1}$, for example between $50 \cdot 10^{-9}$ m·N$^{-1}$ and $200 \cdot 109$ m·N$^{-1}$ and is preferably $100 \cdot 10^{-9}$ m·N$^{-1}$, and the fourth radial flexibility (SR4) is comprised between $0.5 \cdot 10^{-9}$ m·N$^{-1}$ and $10 \cdot 10^{-9}$ m·N$^{-1}$, and is preferably $5 \cdot 10^{-9}$ m·N$^{-1}$.

4

According to a second aspect of the invention, a gas turbine engine is proposed comprising an assembly as previously described.

According to a third aspect of the invention, an aircraft comprising a gas turbine engine as previously described is proposed.

DESCRIPTION OF THE FIGURES

Other characteristics, aims and advantages of the invention will emerge from the following description which is purely illustrative and not limiting and which should be read with reference to the appended drawings in which.

In all the figures, similar elements bear identical references.

DETAILED DESCRIPTION OF THE INVENTION

Figure 1:
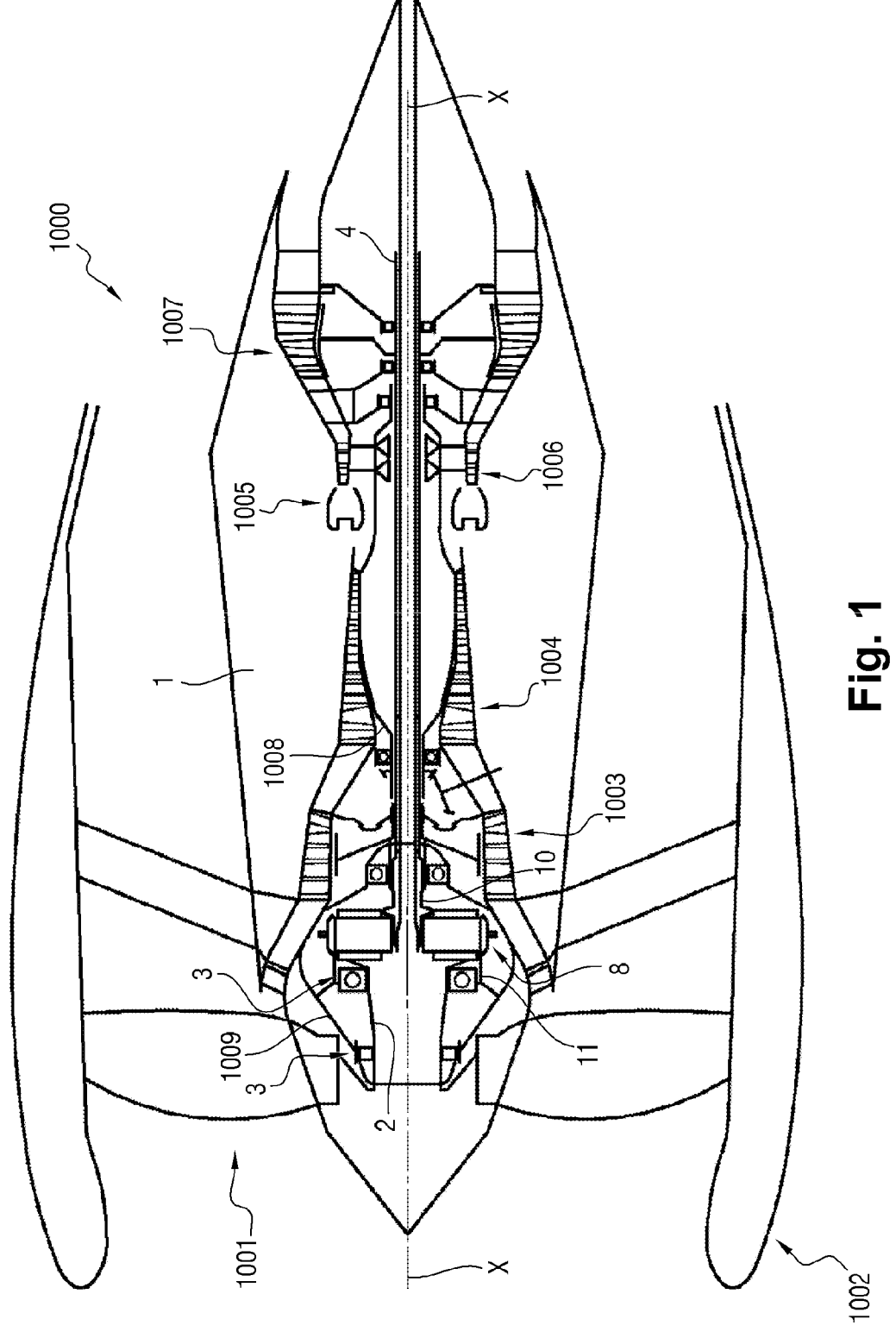
FIG. 1, already described, is a sectional view of a geared turbine engine known from the background.
Figure 2:
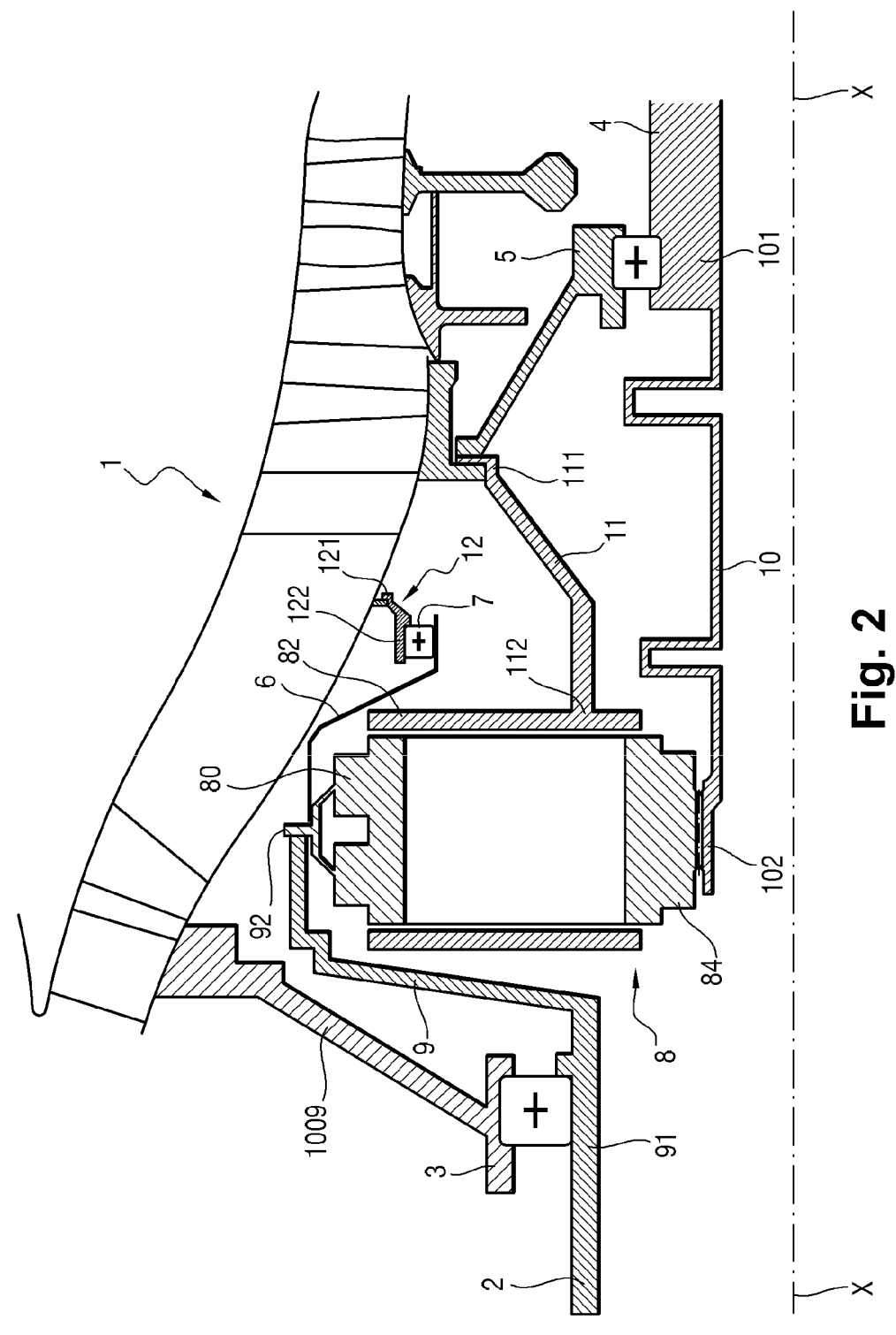
FIG. 2 is a sectional view of one embodiment of a gas turbine engine assembly according to the invention.
Figure 3:
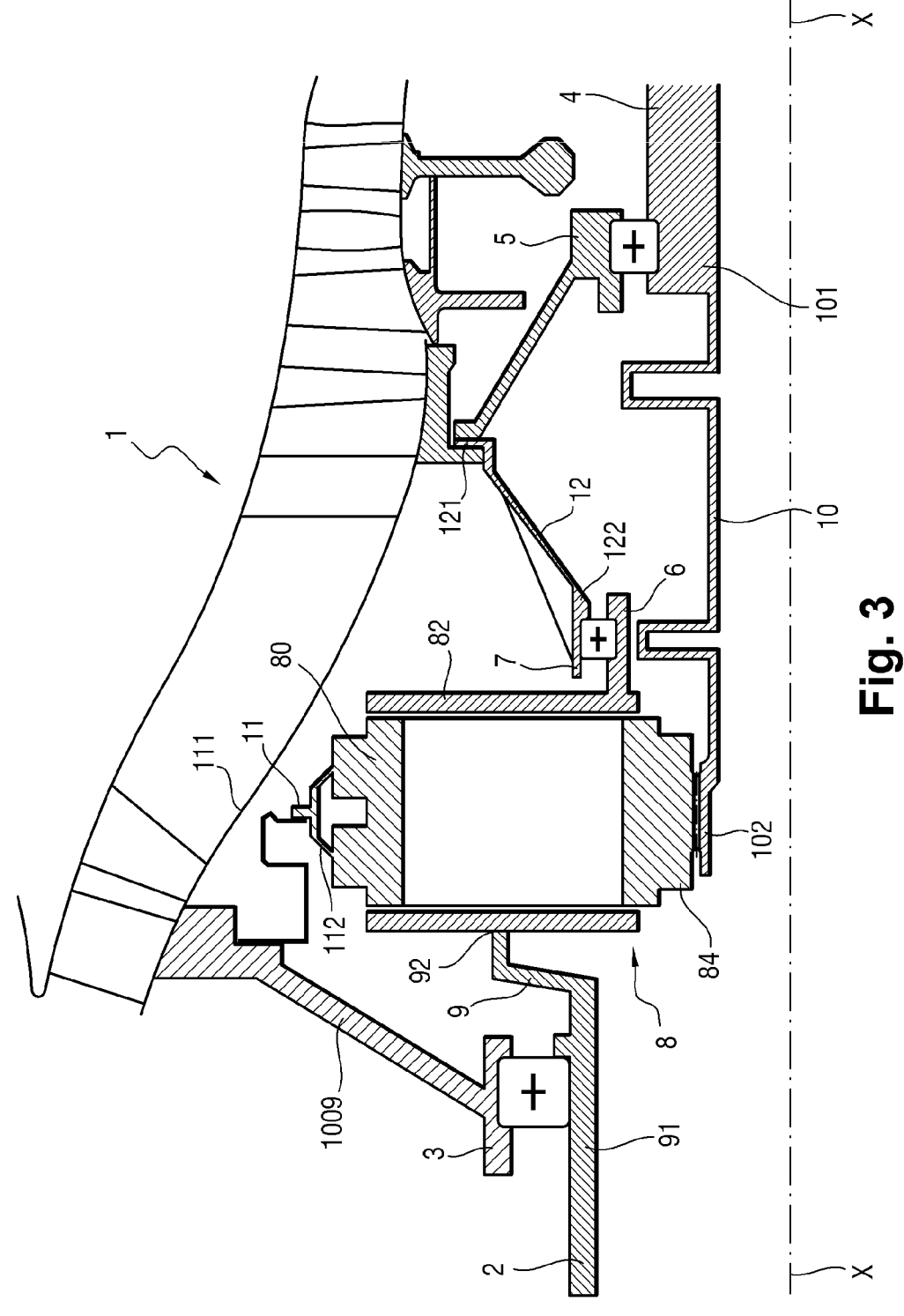
FIG. 3 is a sectional view of one embodiment of a gas turbine engine assembly according to the invention.

FIGS. 2 and 3 each illustrate one embodiment of part of a geared turbine engine 1000. The elements of this gas turbine engine 1000 which do not appear in FIGS. 2 and 3 are similar to the corresponding elements of the gas turbine engine 1000 illustrated in FIG. 1, already described. Of course, the present disclosure is not limited to the geared turbine engines 1000 such as the one illustrated in FIG. 1. Indeed, the present disclosure is for example applicable to the geared turbine engines 1000 comprising more than two spools, typically three spools, but also to the geared turbine engines 1000 whose fan 1001 is unducted.

As visible in FIGS. 2 and 3, the gas turbine engine 1000 also comprises a support shaft 6 movable in rotation relative to the casing 1 about the longitudinal axis, the support shaft 6 being arranged on one side of the mechanical transmission opposite to the side of the mechanical transmission where the fan shaft 2 is arranged. In FIGS. 2 and 3, the fan shaft 2 is arranged upstream of the mechanical transmission device 8, while the support shaft 6 is arranged downstream of the mechanical transmission device 8.

In the present text, the upstream and the downstream are defined in relation to the normal air flow direction through the gas turbine engine 1000 in operation. Likewise, an axial direction corresponds to the direction of the longitudinal axis X-X, a radial direction refers to a direction which is perpendicular to this longitudinal axis X-X and passes therethrough, and a circumferential or tangential direction corresponds to the direction of a planar and closed curved line, all points of which are equidistant from the longitudinal axis X-X.

Moreover, and unless otherwise specified, the terms "inner (or internal)" and "outer (or external)", respectively, are used in reference to a radial direction so that the inner (i.e. radially internal) part or surface of an element is closer to the longitudinal axis X-X than the outer (i.e. radially external) part or surface of the same element.

As visible in each of FIGS. 2 and 3, the mechanical transmission device 8 is preferably an epicyclic gear train comprising a ring gear 80, a plurality of planet gears supported by a carrier 82 and a sun gear 84.

Furthermore, a first bearing 3 is arranged downstream of the fan shaft 2 and fixedly mounted on the casing 1.

Advantageously, the first bearing 3 is a rolling comprising a row of balls, in order to effectively take up the forces exerted on the fan shaft 2. Thus, the first bearing 3 comprises a first ring and a second ring, coaxial and centered on the longitudinal axis X-X, between which one row of balls is placed. The first ring is fixedly mounted on the casing 1 and the second ring is fixedly mounted on the fan shaft 2.

Moreover, a second bearing 5 is fixedly mounted on the casing 1 and configured to support in rotation the turbine shaft 4, upstream of the latter. Advantageously, the second bearing 5 is a rolling comprising a row of balls or a row of rollers, in order to effectively take up the forces exerted upstream of the turbine shaft 4. Thus, the second bearing 5 comprises a third ring and a fourth ring, coaxial and centered on the longitudinal axis X-X, between which a row of balls or rollers is placed. The third ring is fixedly mounted on the casing 1 and the fourth ring is fixedly mounted on the turbine shaft 4.

As visible in each of FIGS. 2 and 3, a first connection element 9 connects the fan shaft 2 to the mechanical transmission device 8. The first connection element 9 is centered on the longitudinal axis X-X. More specifically, the first connection element 9 has a first end 91 connected to the fan shaft 2 and a second end 92 connected to the mechanical transmission device 8. In fact, the first end 91 is mounted on the first bearing 3.

Furthermore, a second connection element 10 connects the turbine shaft 4 to the mechanical transmission device 8. The second connection element 10 is also centered on the longitudinal axis X-X. In addition, the second connection element 10 has a third end 101 connected to the turbine shaft 4 and a fourth end 102 connected to the mechanical transmission device 8. In fact, the third end 101 is mounted on the second bearing 5.

Moreover, a third connection element 11, centered on the longitudinal axis X-X, connects the mechanical transmission device 8 to the casing 1. More specifically, the third connection element 11 has a fifth end 111 fixedly mounted on the casing 1 and a sixth end 112 connected to the mechanical transmission device 8.

In addition, a third bearing 7 is configured to support in rotation the support shaft 6. A fourth connection element 12, also centered on the longitudinal axis X-X, further connects the third bearing 7 to the casing 1. More specifically, the fourth connection element 12 has a seventh end 121 fixedly mounted on the casing 1 and an eighth end 122 connected to the third bearing 7. In one advantageous variant, the third bearing 7 is a rolling comprising a row of balls. Thus, the third bearing 7 comprises a fifth ring and a sixth ring, coaxial and centered on the longitudinal axis X-X, between which a row of balls is placed. The seventh end 121 is fixedly mounted on the fifth ring and the sixth ring is fixedly mounted on the support shaft 6. The presence of the support shaft 6 makes it possible to stabilize the mechanical transmission device 8, but also to take up part of the forces supported by the fan shaft 2.

In the embodiment illustrated in FIG. 2, the second end 92 and the support shaft 6 are each mounted, preferably fixedly mounted, on the ring gear 80 which is movable in rotation about the longitudinal axis X-X, the fourth end 102 is mounted, preferably fixedly mounted, on the sun gear 84 which is movable in rotation about the longitudinal axis X-X, and the sixth end 112 is mounted, preferably fixedly mounted, on the carrier 82.

In the embodiment illustrated in FIG. 3, the second end 92 and the support shaft 6 are each mounted, preferably fixedly mounted, on the carrier 82 which is movable in rotation about the longitudinal axis X-X, the fourth end 102 is mounted, preferably fixedly mounted, on the sun gear 84 which is movable in rotation about the longitudinal axis X-X, and the sixth end 112 is mounted, preferably fixedly mounted, on the ring gear 80.

The first connection element 9 has a first radial flexibility SR1, the second connection element 10 has a second radial flexibility, the third connection element 11 has a third radial flexibility SR3 and the fourth connection element 12 has a fourth radial flexibility SR4.

The radial flexibility SR1, SR2, SR3, SR4 of a connection element 9, 10, 11, 12 is defined intrinsically, that is to say by considering the connection element 9, 10, 11, 12 as such apart from the gas turbine engine 1000, that is to say before or after being mounted in the latter. In this way, it is possible to dimension each connection element 9, 10, 11, 12 absolutely, which makes it possible to integrate it into any gas turbine engine 1000.

Thus, the radial flexibility SR1, SR2, SR3, SR4 of a connection element 9, 10, 11, 12 is defined by assimilating the connection element 9, 10, 11, 12 to a beam embedded at one end 91, 101, 111, 121, and free from being subject to radial movements at the other end 92, 102, 112, 122. In fact, this corresponds to the conditions in which the connection element 9, 10, 11, 12 is biased within the gas turbine engine 1000. For example, the first connection element 9 is less free from being subject to radial movements relative to the casing at the first end 91 than at the second end 92. Hence, the radial flexibility of a connection element 9, 10, 11, 12 is defined as a ratio between, on the one hand, a radial displacement of the free end 92, 102, 112, 122 relative to the embedded end 91, 101, 111, 121 which free end 92, 102, 112, 122 being subjected to a loading in a radial direction, typically a tensile and/or compressive loading and, on the other hand, the force, typically tensile and/or compressive force, applied at the free end 92, 102, 112, 122 to generate this radial displacement.

Such radial flexibility SR1, SR2, SR3, SR4 can for example be measured on a test bench, by embedding one of the ends 91, 92, 101, 102, 111, 112, 121, 122 of the connection element 9, 10, 11, 12, then by radially biasing the other end 91, 92, 101, 102, 111, 112, 121, 122. The choice of the end 91, 92, 101, 102, 111, 112, 121, 122 to be embedded has no importance to the extent that the radial flexibility SR1, SR2, SR3, SR4 of a connection element 9, 10, 11, 12 is associated with a relative displacement between the two ends 91, 92, 101, 102, 111, 112, 121 of the connection element 9, 10, 11, 12. Therefore, it does not matter whether the end 91, 92, 101, 102, 111, 112, 121 embedded during the measurement is actually the end 91, 101, 111, 121 which, during the operation of the gas turbine engine 1000, is subject to radial movements relative to the casing 1 which are smaller compared to the other end 92, 102, 112, 122 of the connection element 9, 10, 11, 12. In any case, it is possible to take into account, for calculating the radial flexibility SR1, SR2, SR3, SR4 of a connection element 9, 10, 11, 12, the relative radial displacements between the free end 92, 102, 112, 122 and the embedded end 91, 101, 111, 121. In fact, within the gas turbine engine 1000, none of the first end 91, the third end 101, the fifth end 111 or the seventh end 121 is strictly radially immobile relative to the casing 1.

For example, the first radial flexibility SR1 is measured by removing the first connection element 9 from the gas turbine engine 1000, placing it on a test bench, embedding the first end 91, and radially biasing the second end 92, typically via a tensile and/or compressive loading in a radial direction. The radial displacement of the free end 92, 102, 112, 122 relative to the embedded end 91, 101, 111, 121, which is associated with each of the radial forces applied at the free end 92, 102, 112, 122, is then noted. Then a regression, for example of linear type, is carried out on all the points noted, and the radial flexibility SR1, SR2, SR3, SR4 of the connection element 9, 10, 11, 12 is determined, typically as the director coefficient of the straight line obtained by linear regression. Of course, it is not necessarily required to use a test bench, since such measurements can also be carried out by computer-assisted digital simulation, typically by isolating the first connection element 9 from the rest of the gas turbine engine 1000, and by simulating the embedding and the bias already described.

By taking into account relations between the radial flexibilities SR1, SR2, SR3, SR4 when dimensioning the connection elements 9, 10, 11, 12, it is possible to relieve the mechanical transmission device 8 of its role of damping the relative radial movements of the fan shaft 2 and/or of the support shaft 6 and/or of the mechanical transmission device 8 and/or of the turbine shaft 4. Indeed, thanks to a certain radial flexibility SR1, SR2, SR3, SR4 of the connection elements 9, 10, 11, 12, the radial displacements of the different components within the mechanical transmission device 8 are limited, which further reduces the mechanical stresses within the mechanical transmission device 8. Hence, the wear of the mechanical transmission device 8 is reduced and its lifespan extended, without it being necessary to strengthen the mechanical transmission device 8, that is to say, to make it heavier.

Of course, the mechanical biases exerted on the mechanical transmission device 8 by the fan shaft 2, the support shaft 6 and the turbine shaft 4 are not limited to a radial direction. In fact, the fan shaft 2, the support shaft 6 and the turbine shaft 4 are also subject to axial movements and circumferential movements (i.e. torsional), which are just as likely to induce stresses in the mechanical transmission device 8.

However, it is possible to consider the radial flexibility of the assembly formed by the first connection element 9, the first bearing 3 and the support 1009, or of the assembly formed by the first connection element 9 and the fan shaft 2, as a reference for determining the second radial flexibility SR2, the third radial flexibility SR3 and the fourth radial flexibility SR4. The definition of the radial flexibility of such assemblies is the same as the one already described for the first radial flexibility SR1. Furthermore, the method for measuring the radial flexibility of such assemblies follows the same protocol as the one already described for the first radial flexibility. Typically, one of the ends of such an assembly, typically one of the axial ends, is embedded, while the other end, typically the other axial end, is subjected to a radial bias. Corresponding displacements and radial forces are noted then correlated to determine the radial flexibility of the assembly which will then serve as a reference to determine the second radial flexibility SR2, the third radial flexibility SR3 and the fourth radial flexibility SR4. In any case, the first radial flexibility SR1 or, more generally, the radial flexibility of one of the assemblies already described, is the lowest of the radial flexibilities SR1, SR2, SR3, SR4. This is in particular achieved by ensuring that the first connection element 9 is the one having a diameter (see FIG. 2) and/or a radial thickness (see FIG. 3) which is the largest of all the connection elements 9, 10, 11, 12. Furthermore, the fan shaft 2 and the support 1009 are dimensioned very rigidly to be able to support the imbalances of the fan 1001 during the operation of the gas turbine engine 1000. Therefore, the intensity of the forces to which the first connection element 9 is subjected, in particular coming from the fan 1001, is significant. Consequently, when dimensioning this part of the gas turbine engine 1000, the first connection element 9 or, more generally, one of the assemblies already described, is chosen as a reference to determine the second radial flexibility SR2, the third radial flexibility SR3 and the fourth radial flexibility SR4. Thus, in operation, it is the radial movements of the second end 92 that control the radial movements of the fourth end 102, the sixth end 112 and the eighth end 122.

Yet, taking the first connection element 9 as a reference to determine the second radial flexibility, the third radial flexibility SR3 and the fourth radial flexibility SR4 has proven to be more relevant than taking the support 1009 of the first bearing 3, as recommended in the background. In fact, the first connection element 9 is closer to the mechanical transmission device 8 than is the support 1009. Consequently, it is possible to access a finer dimensioning of the radial flexibilities SR1, SR2, SR3, SR4. This offers greater freedom in dimensioning the rest of the gas turbine engine 1000, which facilitates the design and reduces time and cost.

In any event, the first radial flexibility SR1 is strictly lower than the fourth radial flexibility SR4, the fourth radial flexibility SR4 is strictly lower than the third radial flexibility SR3, and the third radial flexibility SR3 is strictly lower than the second radial flexibility SR2. This is in particular achieved by ensuring that the second connection element 10 has a smaller diameter than the first connection element 9 and the third connection element 11 and the fourth connection element 12. Consequently, it is easier to dimension the connection elements 9, 10, 11, 12 relative to each other by setting this order of the radial flexibilities SR1, SR2, SR3, SR4 as a design constraint.

Thus, a ratio between the first radial flexibility SR1 and the fourth radial flexibility SR4 is strictly less than 50%. In other words, the fourth radial flexibility SR4 is strictly greater than two (2) times the first radial flexibility SR1. Alternatively, or additionally, a ratio between the first radial flexibility SR1 and the third radial flexibility SR3 is, in one advantageous variant, strictly less than 10%. In other words, the third radial flexibility SR3 is strictly greater than ten (10) times the first radial flexibility SR1. Alternatively, or additionally, a ratio between the first radial flexibility SR1 and the second radial flexibility is, in one advantageous variant, is strictly less than 4%. In other words, the second radial flexibility is strictly greater than twenty-five (25) times the first radial flexibility SR1.

These different ratio values make it possible to ensure good distribution of the radial stresses between the fourth connection element 12 and the third connection element 11 when the second end 92 biases the mechanical transmission device 8 in a radial movement, but also between the second connection element 10 and the third connection element 11 when the second end 92 biases the mechanical transmission device 8 in a radial movement.

These relations between the radial flexibilities SR1, SR2, SR3, SR4 can thus serve as a guide during the dimensioning of this part of the gas turbine engine 1000. Indeed, by ensuring that these relations are met during the design of the gas turbine engine 1000, it is possible to guarantee a reduction of the mechanical stresses within the mechanical transmission device 8 and hence, an increase in its lifespan and an improvement in the efficiency of the gas turbine engine 1000.

In one advantageous embodiment, the second radial flexibility SR2 is comprised between $350*10^{-9}$ m·N$^{-1}$ and $1,500·10^{-9}$ m·N$^{-1}$, typically between $500·10^{-9}$ m·N$^{-1}$ and $1,000\cdot10^{-9}$ m·N$^{-1}$, and is preferably $800\cdot10^{-9}$ m·N$^{-1}$. Moreover, the third radial flexibility SR3 is greater than or equal to $20\cdot10^{-9}$ m·N$^{-1}$, typically between $50\cdot10^{-9}$ m·N$^{-1}$ and $200\cdot10^{-9}$ m·N$^{-1}$ and is preferably $100\cdot10^{-9}$ m·N$^{-1}$. Finally, the fourth radial flexibility SR4 is comprised between $0.5\cdot10^{-9}$ m·N$^{-1}$ and $10\cdot10^{-9}$ m·N$^{-1}$, and is preferably $5\cdot10^{-9}$ m·N$^{-1}$.

The invention claimed is:

1. An assembly comprising:

a casing;

a fan shaft movable in rotation relative to the casing about a longitudinal axis;

a first bearing configured to support in rotation the fan shaft and fixedly mounted on the casing;

a turbine shaft movable in rotation relative to the casing about the longitudinal axis;

a second bearing configured to support in rotation the turbine shaft and fixedly mounted on the casing;

a support shaft movable in rotation relative to the casing about the longitudinal axis;

a third bearing configured to support in rotation the support shaft;

a mechanical transmission device, the turbine shaft driving the fan shaft via the mechanical transmission device;

a first connection element having a first end connected to the fan shaft and mounted on the first bearing, a second end connected to the mechanical transmission device, and a first radial flexibility;

a second connection element having a third end connected to the turbine shaft and mounted on the second bearing, a fourth end connected to the mechanical transmission device, and a second radial flexibility;

a third connection element having a fifth end fixedly mounted on the casing, a sixth end connected to the mechanical transmission device, and a third radial flexibility; and a fourth connection element having a seventh end fixedly mounted on the casing, an eighth end connected to the third bearing, and a fourth radial flexibility;

wherein a ratio between the first radial flexibility and the third radial flexibility is strictly less than 10% and a ratio between the first radial flexibility and the second radial flexibility is strictly less has 4%, and/or a ratio between the first radial flexibility and the fourth radial flexibility is strictly less than 50%.

2. The assembly of claim 1, wherein the mechanical transmission device is an epicyclic gear train comprising a ring gear, a plurality of planet gears supported by a carrier and a sun gear.

3. The assembly of claim 2, wherein the second end and the support shaft are each mounted on the ring gear which is movable in rotation about the longitudinal axis, the fourth end is mounted on the sun gear which is movable in rotation about the longitudinal axis, and the sixth end is mounted on the carrier.

4. The assembly of claim 2, wherein the second end and the support shaft are each mounted on the carrier which is movable in rotation about the longitudinal axis, the fourth end is mounted on the sun gear which is movable in rotation about the longitudinal axis, and the sixth end is mounted on the ring gear.

5. The assembly of claim 1, wherein the first bearing is a rolling comprising a row of balls.

6. The assembly of claim 1, wherein the second bearing is a rolling comprising a row of balls or of rollers.

7. The assembly of claim 1, wherein the third bearing is a rolling comprising a row of balls.

8. The assembly of claim 1, wherein the second radial flexibility is comprised between $350*10^{-9}$ m*N$^{-1}$ and $1,500\times10^{-9}$ m*N$^{-1}$.

9. The assembly of claim 8, wherein the second radial flexibility is comprised between $500\times10^{-9}$ m*N$^{-1}$ and $1,000\times10^{-9}$ m*N$^{-1}$.

10. The assembly of claim 9, wherein the second radial flexibility is $800\times10^{-9}$ m*N$^{-1}$.

11. The assembly of claim 1, wherein the third radial flexibility is greater than or equal to $20\times10^{-9}$ m*N$^{-1}$.

12. The assembly of claim 11, wherein the third radial flexibility is comprised between $50\times10^{-9}$ m*N$^{-1}$ and $200\times10^{-9}$ m*N$^{-1}$.

13. The assembly of claim 12, wherein the third radial flexibility is $100\times10^{-9}$ m*N$^{-1}$.

14. The assembly of claim 1, wherein the fourth radial flexibility is comprised between $0.5\times10{-9}$ m*N$-1$ and $10\times10{-9}$ m*N$-1$.

15. The assembly of claim 14, wherein the fourth radial flexibility is $5\cdot10^{-9}$ m*N$^{-1}$.

16. A gas turbine engine comprising a fan, a turbine section and the assembly of claim 1, wherein the fan shaft drives the fan and the turbine shaft is driven by the turbine section.

17. An aircraft comprising the gas turbine engine of claim 16.

* * * * *